(12) United States Patent
Suri

(10) Patent No.: US 10,060,417 B2
(45) Date of Patent: Aug. 28, 2018

(54) PLANT FOR GENERATING POWER

(71) Applicant: Vikrant Suri, Punjab (IN)

(72) Inventor: Vikrant Suri, Punjab (IN)

( * ) Notice: Subject to any disclaimer, the term of this patent is extended or adjusted under 35 U.S.C. 154(b) by 81 days.

(21) Appl. No.: 15/133,453

(22) Filed: Apr. 20, 2016

(65) Prior Publication Data

US 2017/0022982 A1     Jan. 26, 2017

(30) Foreign Application Priority Data

Jan. 27, 2016   (IN) .............................. 201611002977

(51) Int. Cl.
*F03G 6/00*     (2006.01)

(52) U.S. Cl.
CPC .............. *F03G 6/003* (2013.01); *Y02E 10/46* (2013.01)

(58) Field of Classification Search
CPC ................................. F03G 6/003; Y02E 10/46
See application file for complete search history.

(56) References Cited

U.S. PATENT DOCUMENTS

| | | | | |
|---|---|---|---|---|
| 4,391,100 A * | 7/1983 | Smith | ..................... | F03G 6/065 126/573 |
| 2002/0084063 A1* | 7/2002 | Gawthrop | ............... | F25B 39/04 165/110 |
| 2004/0088983 A1* | 5/2004 | Brasz | ..................... | F01D 5/048 60/651 |
| 2009/0199557 A1* | 8/2009 | Bennett | ................... | F01K 3/008 60/641.15 |
| 2009/0220329 A1* | 9/2009 | Pickard | .................. | F01D 1/026 415/1 |
| 2010/0156111 A1* | 6/2010 | Pesce | .................... | F01K 23/065 290/1 A |
| 2011/0164958 A1* | 7/2011 | Saitoh | ..................... | F01D 1/026 415/1 |

* cited by examiner

*Primary Examiner* — Audrey K Bradley
(74) *Attorney, Agent, or Firm* — Greenberg Traurig, LLP

(57) ABSTRACT

The present invention relates to a solar power plant comprising a heating assembly (12), a turbine assembly (14) and a cooling assembly (16) connected to form a closed loop. The heating assembly (12) and the cooling assembly (16) comprise a heating unit (20) and a cooling unit (46) respectively, each made up of plurality of metal tubes and metal pipes interconnected to form a continuous channel for passage of a working fluid. The turbine assembly (14) comprises a circular turbine surrounded by a metal conduit on its exterior surface which penetrates the side walls of the circular turbine into interior surface of the circular turbine and ends with a jet facing an impeller. An inconsumable working fluid passes through the closed loop and rotates the impeller which in turn rotates a generator in order to generate power.

18 Claims, 7 Drawing Sheets

PLANT FOR GENERATING POWER

CROSS REFERENCE TO RELATED APPLICATIONS

This application claims the benefit of and priority to Indian Patent Application No. 201611002977 filed on Jan. 27, 2016, the disclosure of which is hereby incorporated in its entirety by reference.

FIELD OF INVENTION

The present invention relates to a power generation plant. Particularly, the present invention relates to a power plant for conversion of solar energy to electrical energy. More particularly, the present invention relates to electricity power generating plant utilizing vacuum-vapour solar/thermal energy.

BACKGROUND OF THE INVENTION

The worldwide energy demands have been increasing rapidly with growing industrialization and globalization. A hefty amount of non-renewable sources of energy are being expended in the form of electricity and petroleum-based fuels. With the decreasing difference between demand and supply of petroleum based fuels, there is an increase in amount of irrational premium payment by the importer countries and that puts a lot of pressure on the economy of developing countries like India. Alternate/renewable modes of generating usable energy is therefore need of the hour.

Solar energy is one of the most widely used alternate sources of energy which utilises sunlight and converts it to electricity either directly using photovoltaics (PV), or indirectly using concentrated solar power (CSP). Photovoltaics converts light into electric current using the photoelectric effect whereas concentrated solar power systems use lenses or mirrors and tracking systems to focus a large area of sunlight into a small beam. These state of the art systems however are expensive and require substantial installation costs and large installation area and their efficiency is affected by environmental pollution and other factors.

Further, the existing solar power plants require direct/indirect sunlight for their functioning and therefore, they function only in the presence of sunlight. The efficiency of the existing systems start decreasing after sometime and normally have a life span of 25 years.

Therefore, an economical and efficient system for generation of electricity is required which reduces material, installation and maintenance costs, reduces fuel consumption, has a longer life span and is capable of working at ambient temperature of the atmosphere.

SUMMARY OF THE INVENTION

The present invention provides a power plant as a means to generate alternate energy. More specifically, it provides for generation of electricity from the solar energy.

The power plant encompassed by the present invention is cost effective and efficient since the installation cost, running cost and maintenance cost incurred therein is comparatively low. It does not require any fuel consumption for its working and covers very less surface area as against the existing solar power plants.

The present invention, in particular, relates to a solar power plant that utilizes temperature—pressure gradient of a working fluid to run a turbine. The difference in temperature and pressure is achieved by employing specially designed heating and cooling units which are then appropriately positioned with respect to the turbine and each other such that the working fluid is heated up in the heating unit and its vapours are made to travel and strike the turbine with a magnitude sufficient enough to rotate and generate power. Once the vapours pass through the turbine, they are made to travel back to the heating unit via cooling unit where they are cooled down to a liquid form which can be reutilized for another cycle.

In accordance with the above, the present invention relates to a plant for generating power (10), said plant comprising a heating assembly (12), a turbine assembly (14), and a cooling assembly (16), wherein the heating assembly (12) comprises at least one heating unit (20) which further comprises a plurality of parallely and vertically aligned thin heating metal pipes (22) connected at both the ends by horizontally aligned heating metal tubes (24), wherein the said heating metal pipes (22) and heating metal tubes (24) are connected in such a way to make a continuous channel for the passage of heated-up working fluid. The turbine assembly (14) comprises a circular turbine (30) adapted to receive an impeller (32) which is in turn connected to a dynamo/generator (60), wherein, said turbine (30) has side walls (34) having an interior surface (36) facing the impeller (32) and an exterior surface (40) surrounded by a loop of metal conduit (38), branches of which penetrate the side walls (34) to eject the vapours of the working fluid over the impeller (32). The turbine (30) is enclosed in a metal casing (26) having an inlet point (42) to receive a collector pipe (28) carrying working liquid from the heating assembly (12) and an outlet point (44) for the passage of a carrier pipe (56) carrying the cooled-down working fluid to the cooling assembly (16). The cooling assembly (16) comprises at least one cooling unit (46) which further comprises a plurality of parallely and vertically aligned thin cooling metal pipes (48) connected at both the ends by horizontally aligned cooling metal tubes (50), wherein the said cooling metal pipes (48) and cooling metal tubes (50) are connected in such a way to make a continuous channel for the passage of cooled down working fluid; wherein the cooling metal tubes (50) towards the top of cooling assembly (16) receives the cooled-down working fluid from the carrier pipe (56). The cooling metal tube (50) towards the base of the cooling assembly (16) is connected to the heating metal tubes (24) towards the base of the heating assembly (12) wherein, the cooling assembly (16) is placed at a higher elevation relative to the heating assembly (12) and the turbine assembly (14) is placed at a higher elevation relative to the cooling assembly (16).

BRIEF DESCRIPTION OF DRAWINGS

FIG. 4.

DETAILED DESCRIPTION OF THE INVENTION

Figure 1:
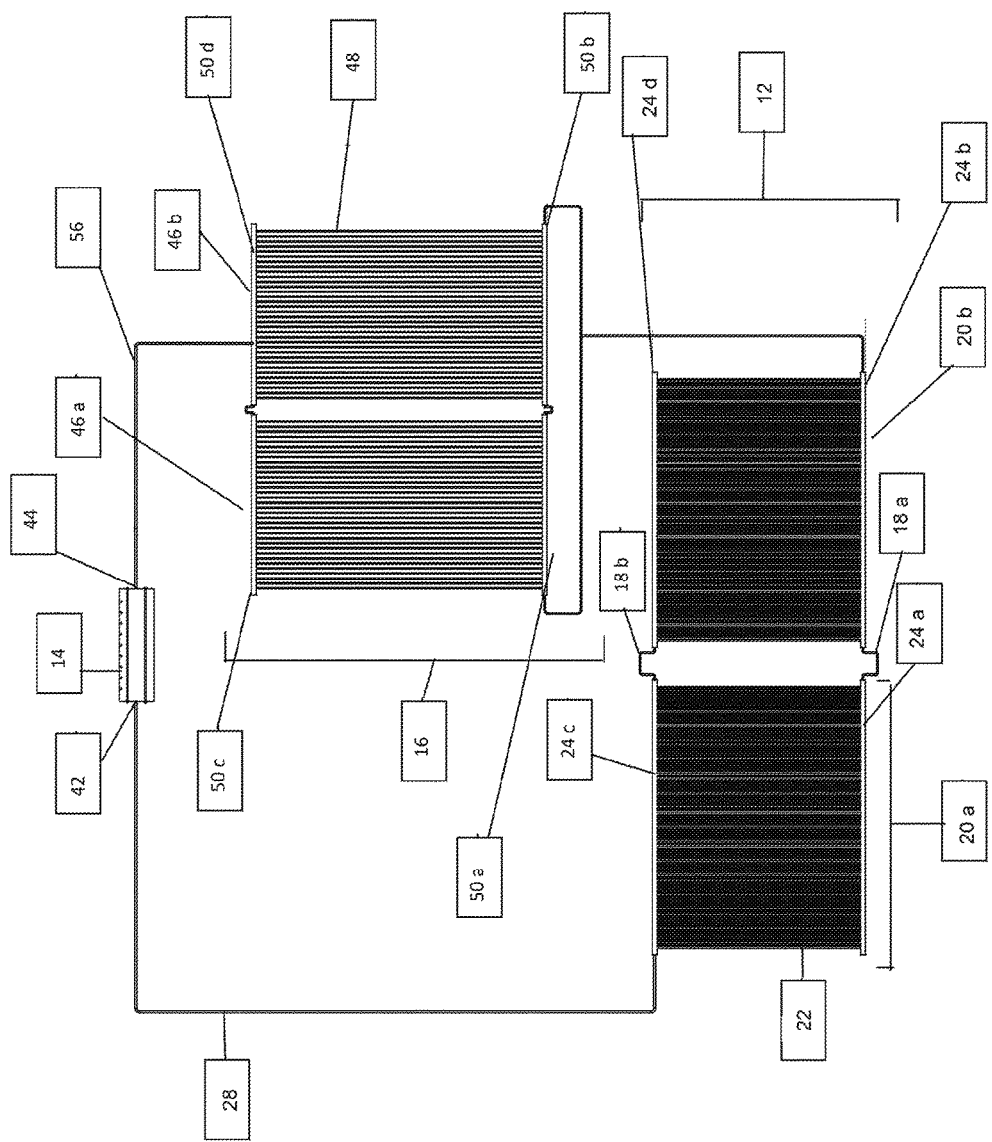
FIG. 1 is a block diagram showing a basic structure of a plant for generating power according to the present invention.

The following reference numerals have been used in the description to refer to the specific features/components of the present invention and have been indicated in the drawings. Like reference numerals refer to the same feature/component throughout the description and the different drawings.

{Heating units 20(a-e)} [1]
{Heating units 20(f-h)} [2]
Plant for generating power (10)
Heating assembly (12)
Turbine assembly (14)
Cooling assembly (16)
Connecting pipes (18)
Heating unit (20)
Thin heating metal pipes (22)
Heating metal tubes (24)
Metal casing of turbine (26)
Collector pipe (28)
Circular turbine (30)
Impeller (32)
Side walls of turbine (34)
Interior surface of turbine (36)
Loop of metal conduit (38)
Exterior surface of circular turbine (40)
Inlet point of turbine (42)
Outlet point of turbine (44)
Cooling unit (46)
Thin cooling metal pipes (48)
Cooling metal tubes (50)
Capillaries/sub branches (52)
Slits in the side walls of turbine (54)
Carrier pipe from turbine to top of cooling assembly (56)
Nozzles/jets (58)
Dynamo/generator (60)
Vertically aligned fins of impeller (62)
Shaft of dynamo (64)
Servicing points for filling diethyl ether (66)

The present invention relates to a self-contained assembly and does not consume any fuel while generating electricity. The design of the plant is simple and compact and does not require large installation area and cost. The efficiency of the plant is not affected by environmental pollution and other factors which are typically a concern with other solar power plant systems.

In accordance with the above, the present invention is based on the reuse of working fluid which undergoes heating and cooling cycles utilizing solar energy and temperature-pressure gradient to generate power. The phrase 'working fluid' used herein refers to an inert organic liquid having low latent heat of vaporization and a boiling point below 60° C. More preferably, the latent heat of vaporization is in the range of 15 to 30 Kilo Joule per mole at 11° C. and a boiling point in the range of 10° C. to 40° C. Working fluids may be selected from a group consisting of diethyl ether, dichloromethane, pentane, hexane, propane and a combination thereof. Preferably, the working fluid is diethyl ether. More preferably, the working fluid is diethyl ether of 99% purity. Table 1 given below provides a list of Liquids which may be used as Working Fluid in the present invention. The table and other sections of the description only provides names of exemplary working fluids and a person skilled in the art will be acquaint of the fact that any other working fluid that meets the aforementioned criteria can also be used with the present invention.

TABLE 1

Exemplary Working fluids

| S. No | Inert Liquid | Chemical Formula | Boiling Point | Latent Heat of Vaporization (in KJ/mol) | Dielectric Constant | Density (g/ml) |
|---|---|---|---|---|---|---|
| 1. | Diethyl ether | $C_4H_{10}O$ | 35° C. | 27.53 at 11.85° C. to 27.25 at 22.48° C. | 4.3 | 0.713 |
| 2. | Pentane | $C_5H_{12}$ | 36° C. | 26.2 at 25° C. to 25.79 at 36.1° C. | 1.84 | 0.626 |
| 3. | Cyclopentane | $C_5H_{10}$ | 40° C. | 27.3 at 49.2° C. | 1.97 | 0.751 |
| 4. | Dichloromethane | $CH_2Cl_2$ | 40° C. | 28.6 at 25° C. | 9.1 | 1.3266 |

As explained above, for working of the power plant it is required that the working fluid travels through the heating assembly, the turbine assembly and the cooling assembly. FIG. 1 provides an illustration of a simple arrangement for the working of the power plant.

The heating assembly (12) encompassed by the present invention comprises at least one heating unit (20). The number of heating units may be increased depending upon the space and efficiency factors. The heating units may also be varied in size, length or breadth. For instance, the heating assembly as shown in FIG. 1 comprises two heating units (20a and 20b). Said heating units (20a, 20b) are connected to each other through connecting pipes (18a and 18b). The heating units (20) are typically arranged parallel to each other.

Figure 2:
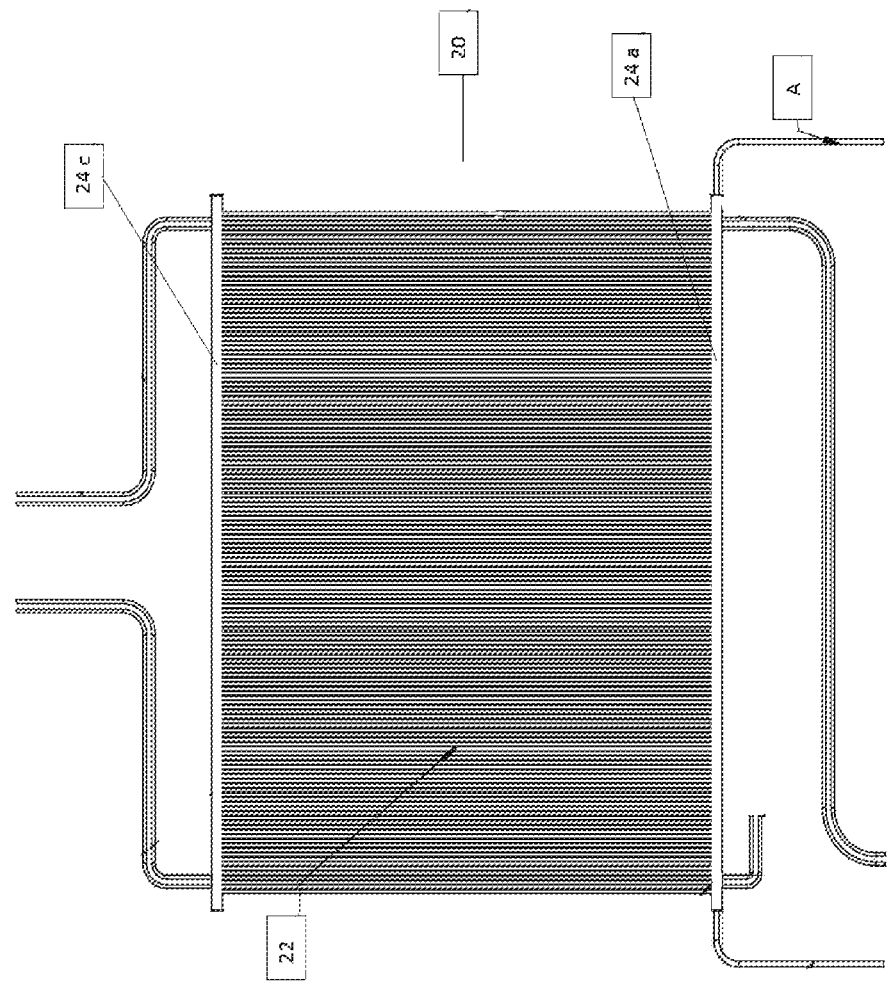
FIG. 2 is a block diagram representing a single unit of heating assembly (12)

Each heating unit (20) (as shown in FIG. 2) is made up of a plurality of parallely and vertically aligned thin heating metal pipes (22) connected at both the ends by horizontally aligned heating metal tubes (24), wherein the said heating metal pipes (22) and heating metal tubes (24) are connected in such a way to make a continuous channel for the passage of heated-up working fluid. Both the heating metal pipes (22), heating metal tubes (24) are made up of a metal having high thermal conductivity. Preferably, the metal is selected from a group of copper, aluminium, zinc, brass and alloys thereof. More preferably, the metal used for making thin heating metal pipes (22) and the heating metal tubes (24) is copper.

In the event, there are more than one heating units, for example as shown in FIG. 1, the same may be placed at the same height or at different height with respect to each other. Said more than one heating units (20) are inter connected to each other in such a way that the heating metal tubes (24) towards the bottom (24a, 24b) are connected to each other and those towards the top (24c, 24d) are in continuation with each other. The heating unit is designed to heat the Working Fluid, by either direct solar rays or the ambient temperature of the atmosphere (i.e. by conduction and convection). The heating units (20) are adapted to be inclined to face the Sun so as to have maximum conversion of the working fluid into its vapours. The angle of inclination of the heating units (20) may be changed depending upon the latitude position of the sun. In an event of more than one heating unit (20) in a heating assembly (12), the heating units are placed at varying heights relative to each other. The working fluid is introduced into the heating assembly through the heating metal tube (24) at the top of heating unit (20) which then enters the thin heating metal pipes and the heating metal tubes configured towards the bottom of the heating unit. The working fluid gets heated up in the heating unit and the vapours thereof rises and travels towards the turbine assembly (14).

The heating assembly (12) is connected to the turbine assembly (14) through a collector pipe (28) which carries the heated up vapours of the working fluid to the inlet of the turbine assembly (42). The collector pipe (28) carries the vapours obtained from the heating unit/s of the heating assembly.

Figure 3A:
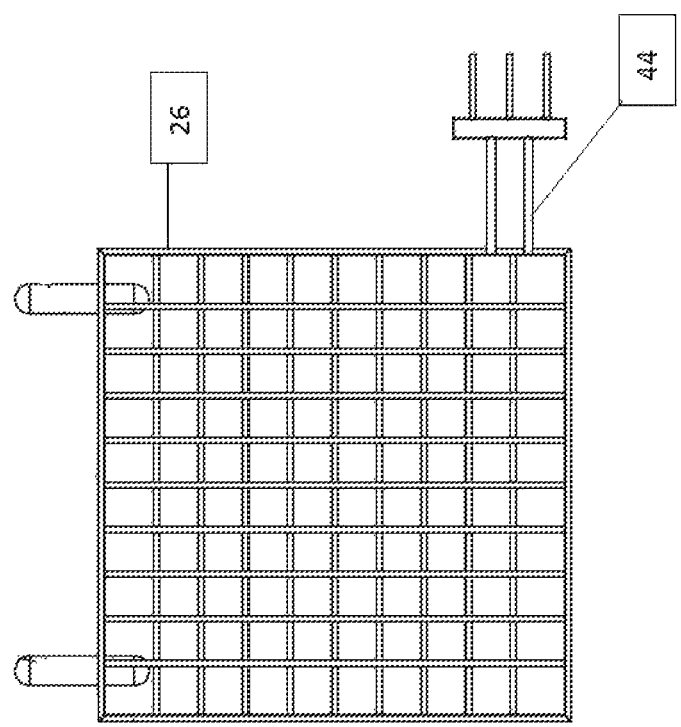
FIG. 3(a) is a top view and FIG. 3(b) is a perspective view of metal casing of a turbine assembly according to the present invention.
Figure 3B:
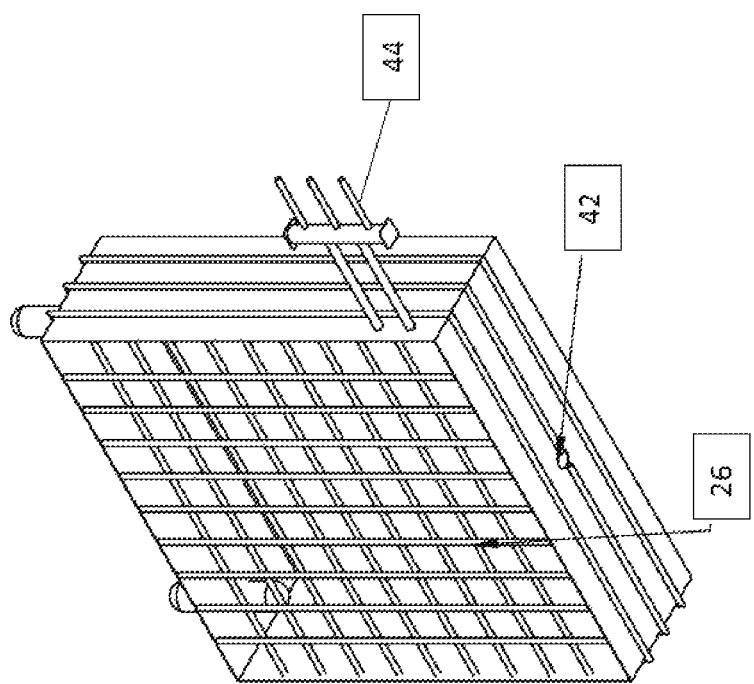
Figure 4A:
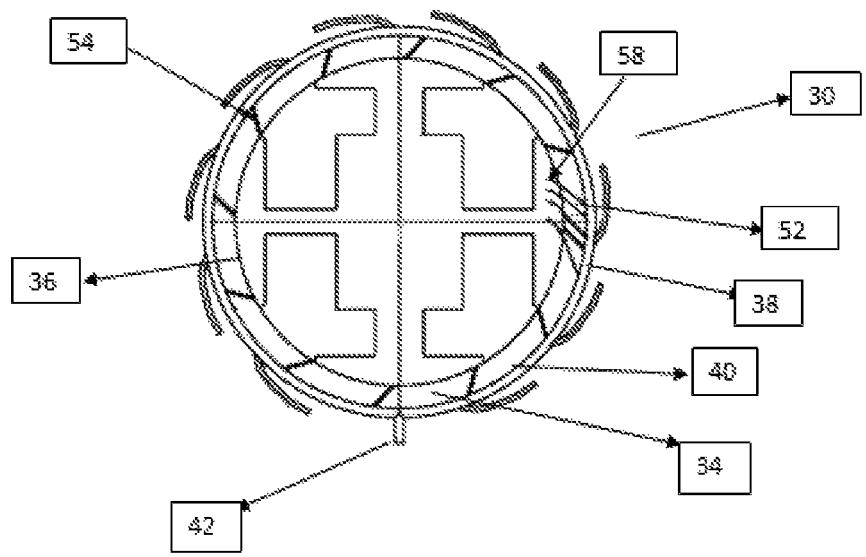
FIG. 4(a) is a top view of the circular turbine (30) &
Figure 4B:
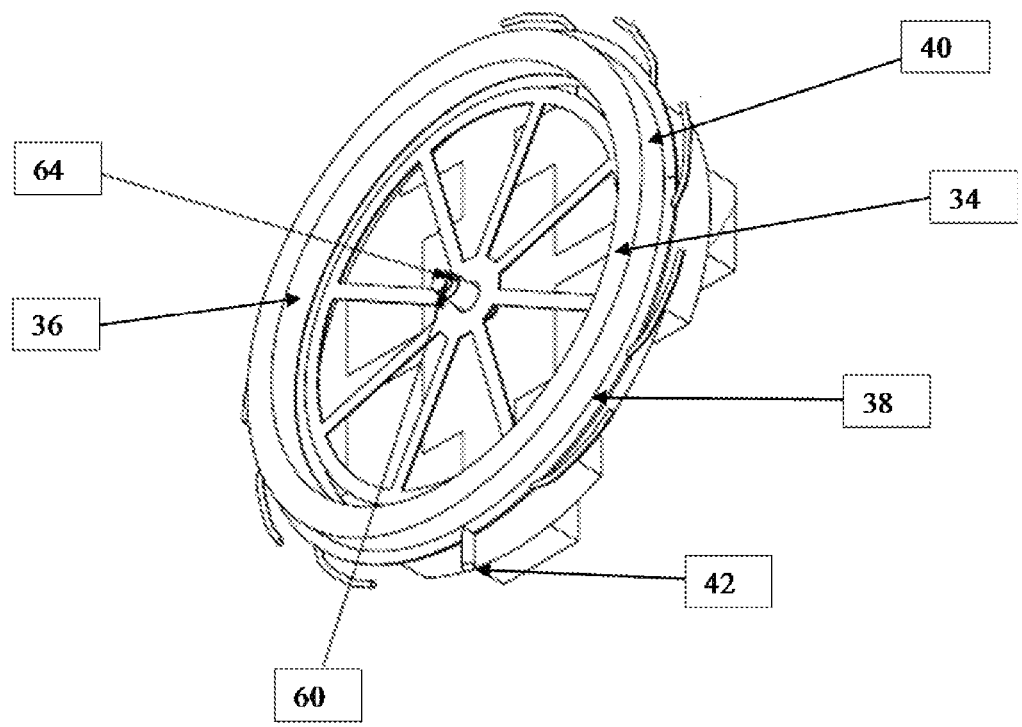
FIG. 4(b) is a perspective view of the circular turbine (30)
Figure 5:
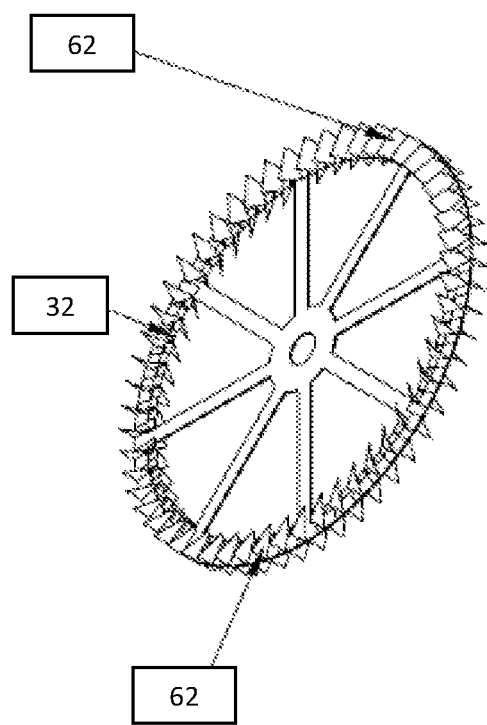
FIG. 5 is a perspective view of impeller (32) of the turbine assembly according to the present invention.

The turbine assembly (14) (as shown in FIGS. 3-5) comprises a metal casing (26)(FIG. 3(b)) having an inlet (42) to receive a collector pipe (28) from the heating assembly (12) and an outlet point (44) for passage of a carrier pipe (56) carrying the cooled-down working fluid to the cooling assembly (16). The metal casing (26) is configured to receive a circular turbine (30) which is further adapted to receive an impeller (32). The impeller (32) is in turn connected to a dynamo/generator (60) through a shaft (64). The circular turbine (30) (FIG. 4) has side walls (34) having an interior surface (36) facing the impeller (32) and an exterior surface (40) surrounded by a loop of metal conduit (38). The branches of the metal conduit (38) surrounding the turbine (30) further branch into plurality of capillaries/sub-branches (52) of narrower dimensions. The sub-branches/capillaries (52) of the metal conduit (38) penetrate the side walls (34) to eject the vapours of the working fluid over the impeller (32). The side walls (34) of the circular turbine (30) has slits (54) at regular intervals through-out the circumference of the circular turbine (30) and the branches/sub-branches arising from the metal conduit (38) are configured to pass through the slits into interior of the circular turbine (30). The branch/sub-branch (52) facing the impeller (32) end with a nozzle/jet (58) which are soldered onto the ends of the branches/sub-branches (52) entering into the interior side of the circular assembly and facing the impeller (32). The dimensions of the branches arising out of the metal conduit (38) narrows down towards the interior side of the circular turbine (30) so that the pressure of the heated vapours coming from the heating assembly becomes highest at the exit point of the nozzle which in turn exerts maximum thrust on the impeller (32).

The impeller (32) is made up of a light weight metal. The impeller (32) of the turbine assembly (14) is designed to work at low pressures, preferably in the range of approximately 4 psi (pounds per square inch) to 30 psi. Preferably, the impeller (32) is made up of aluminium or alloys thereof. The impeller used herein is impulse type (as shown in FIG. 5), having at least two blades having fins (62) aligned perpendicular to the direction of the nozzles (58). The impeller (32) is connected to a dynamo/generator (60) through a shaft (64)

The cooling assembly (16) comprises at least one cooling unit (46). As shown in FIG. 1, the cooling assembly comprises two cooling units (46a, 46b). Each cooling unit (46) further comprising a plurality of parallely and vertically aligned thin cooling metal pipes (48) connected at both the ends by horizontally aligned cooling metal tubes (50). The cooling metal pipes (48) and cooling metal tubes (50) are connected in such a way to make a continuous channel for the passage of cooled down working fluid. Each cooling metal pipe (48) is wrapped with a water absorbent fabric. Any water absorbent fabric may be utilized for absorbing and holding cooling medium/water around the cooling metal pipes (48) so that the vapours of the working liquid/heated up liquid gets cooled down in the cooling unit (46) and gets collected at the base of each cooling unit (46a/46b).

The construction and assembly of the cooling units (46a/46b) is similar to that of the heating units (20a/20b) in the heating assembly (12). All cooling units are interconnected to each other by the connecting pipes. The cooling assembly (16) as shown in FIG. 1 comprises of two cooling units (46a and 46b), the said cooling units (46a, 46b) are continuous with each other through connecting pipes in such a way that the cooling metal tube (50a) towards the bottom of first cooling unit (46a) is connected to the cooling metal tube (50b) towards the bottom of the second cooling unit (46b). Similarly, cooling metal tube (50c) towards the top of first cooling unit (46a) is connected to the cooling metal tube (50d) towards the top of the second cooling unit (46b). There may be more cooling units (46) in the cooling assembly (16) connected to each other in a similar manner. The cooling units (46) of the cooling assembly (16) may be placed at the same height or at different height with respect to each other. The cooling metal pipes (48) and cooling metal tubes (50) are made up of material selected from a group of copper, aluminium, zinc, brass and alloys thereof. Preferably, the cooling metal pipes (48) and the cooling metal tubes (50) are made up of copper.

In an embodiment, each of the heating unit (20) and the cooling unit (46) comprises a plurality of thin metallic pipes (22/48) arranged in a geometric relationship with their ends connected to a set of metallic tubes (24/50). The geometric relationship may be parallel, vertically aligned, angular, crisscross or intersecting.

The cooling metal tubes (50) towards the top of cooling assembly (16) receives the cooled-down working fluid from the carrier pipe (56) coming out of the turbine assembly. The cooling metal tube (50) towards the base of the cooling assembly (16) is connected to the heating metal tubes (24) towards the base of the heating assembly (12) to receive the cooled down liquid back into the heating assembly (12) for further heating and recirculation in the power plant.

The heating assembly (12), the turbine assembly (14) and the cooling assembly (16) are interconnected by connecting tubes to form a closed loop system. The entire system is sealed to ensure no loss of working fluid during the operation/working of the power plant.

The cooling assembly (16) is placed at a higher elevation relative to the heating assembly (12) and the turbine assembly (14) is placed at a higher elevation relative to the cooling assembly (16). The heating assembly (12) and the cooling assembly (16) are maintained at different temperature and height. The temperature of the cooling assembly (16) is kept at a lower temperature than that of the heating assembly (12) using a cooling medium.

Working of the Invention

The power plant of the present invention runs on the Temperature difference between the heating assembly (12) and the cooling assembly (16). The Heating Assembly (12) is kept at ground/lower level and the working liquid is introduced in the Heating Assembly (12), to be re-heated by ambient/solar/thermal heat, by the processes of conduction and convection. The entire heating assembly (12) or at least one heating unit (20) is inclined to face the Sun so as to have maximum conversion of the working fluid into its vapours. The vapours of the working fluid from different heating units (20) collect in the collector pipe (28), which carries the heated up vapours of the working fluid into the turbine assembly (14). The vapours of the working fluid enters the metal conduit (38) and pass through the branches and sub-branches/capillaries (52) and are thrown out of the nozzle/jets (58) onto the impeller (32). When the heated up vapours strikes at the vertically aligned fins (62) of the impeller (32) with a pressure, the impeller (32) rotates which in turn rotates the generator/dynamo (60) connected to the impeller through a shaft (64).

The vapours of the working liquid after striking the impeller (32) transfers its energy to the impeller (32). They either get cooled down to a lower temperature or get condensed to the liquid form and collect at the base of the turbine assembly (14) and thereafter are drawn into the cooling assembly (16) by gravity flow through the carrier pipe (56). The vapours of the working liquid from the turbine assembly (14) enter the carrier pipe (56) due to a pressure difference between the heating assembly (12) and the cooling assembly (16). Since the pressure in the Cooling Assembly is lower and the pressure in the Heating Assembly higher, the pressurised vapours of the working Fluid are drawn in by the Cooling Assembly (16).

The vapours of the working fluid are cooled down to a lower temperature in the cooling units (46) by wetting the absorbent cloth of the cooling pipes (48) with water. Water is sprayed at the cooling units (46) of the cooling assembly (16) at short intervals so that the vapours of the working fluid get cooled down to the liquid form. A water spraying medium may be used for wetting the cooling assembly. Alternatively, any other cooling method may be employed for cooling vapours of the working liquid.

The cooling assembly (16) is kept at a higher elevation as compared to the heating assembly (12). The Working Fluid collects at the base of the Cooling Assembly/Units and is re-fed into the base of the Heating Assembly/Units by means of a connecting tube leading from the base of the Cooling Assembly (16) to the base of the Heating Assembly (12).

The height of the cooling assembly (16) is kept at least 18 feet above the heating assembly (12). This is due to the reason that pressure created by the Vapours of the working Fluid in the Heating Assembly (12), apart from feeding/supplying Vapours to Turbine assembly (14), also exerts pressure on the Working Fluid in the Heating Assembly (12) and thus, the level of the Working Fluid rises in the pipes connecting the base of the Heating Assembly (12) to the base of the Cooling Assembly (16). Therefore, to avoid the backflow of the working fluid into the Cooling Assembly (16), the Cooling Assembly is kept above the Heating Assembly. Table 2 given below depicts the required height difference between the base of the Heating Assembly (12) and the base of the Cooling Assembly (16) to sustain varying degrees of pressure (in the Heating Assembly) and to prevent back flow of working liquid into the cooling assembly (16) from the heating assembly (12) when diethyl ether is used as a working fluid. Similarly, the turbine assembly (14) is kept above the heating assembly (12) to maintain a pressure difference between the two and to prevent flow of working fluid into the turbine assembly (14).

TABLE 2

Height difference between Heating Assembly (12) and Cooling Assembly (16) required to achieve the specific vapour pressure to feed vapours to the turbine assembly (14) when diethyl ether is used as working fluid.

| S. No. | Pressure (in psi) | Height difference (in feet) |
|---|---|---|
| 1 | 1 | 3.24 |
| 2 | 2 | 6.48 |
| 3 | 3 | 9.72 |
| 4 | 4 | 12.96 |
| 5 | 5 | 16.2 |
| 6 | 6 | 19.44 |
| 7 | 7 | 22.68 |
| 8 | 8 | 25.92 |
| 9 | 9 | 29.16 |
| 10 | 10 | 32.4 |
| 11 | 11 | 35.64 |
| 12 | 12 | 38.88 |
| 13 | 13 | 42.12 |
| 14 | 14 | 45.36 |
| 15 | 15 | 48.6 |
| 16 | 16 | 51.84 |
| 17 | 17 | 55.08 |
| 18 | 18 | 58.32 |
| 19 | 19 | 61.56 |
| 20 | 20 | 64.8 |
| 21 | 21 | 68.04 |
| 22 | 22 | 71.28 |
| 23 | 23 | 74.52 |
| 24 | 24 | 77.76 |
| 25 | 25 | 81 |
| 26 | 26 | 84.24 |
| 27 | 27 | 87.48 |
| 28 | 28 | 90.72 |
| 29 | 29 | 93.96 |
| 30 | 30 | 97.2 |

Further, the higher is the temperature of working fluid in the Heating Assembly (12), the higher will be the pressure generated by the vapours of the working fluid. Table 3 shows the pressures generated by vapours of diethyl ether at various temperatures.

TABLE 3

Variation of pressure with temperature for diethyl ether as a working fluid.

| S. No. | Temperature ° C. | Pressure (In psi) |
|---|---|---|
| 1. | 0 | 3.57 |
| 2. | 10 | 5.57 |
| 3. | 15 | 6.28 |
| 4. | 16 | 6.42 |
| 5. | 17 | 6.5 |
| 6. | 18 | 6.76 |
| 7. | 19 | 7.06 |
| 8. | 20 | 7.34 |
| 9. | 21 | 7.69 |
| 10. | 22 | 8.85 |
| 11. | 23 | 9.53 |
| 12. | 24 | 9.91 |
| 13. | 25 | 10.33 |
| 14. | 26 | 10.70 |
| 15. | 27 | 11.12 |

TABLE 3-continued

Variation of pressure with temperature for diethyl ether as a working fluid.

| S. No. | Temperature ° C. | Pressure (In psi) |
| --- | --- | --- |
| 16. | 28 | 11.55 |
| 17. | 29 | 11.99 |
| 18. | 30 | 12.44 |
| 19. | 31 | 12.92 |
| 20. | 32 | 13.399 |
| 21. | 33 | 13.89 |
| 22. | 34 | 14.4 |
| 23. | 35 | 14.69 |
| 24. | 36 | 15.47 |
| 25. | 37 | 16.03 |
| 26. | 38 | 16.6 |
| 27. | 39 | 17.19 |
| 28. | 40 | 17.79 |
| 29. | 41 | 18.42 |
| 30. | 42 | 19.05 |
| 31. | 43 | 19.71 |
| 32. | 44 | 20.38 |
| 33. | 45 | 21.07 |
| 34. | 46 | 21.77 |
| 35. | 47 | 22.5 |
| 36. | 48 | 23.25 |
| 37. | 49 | 24.01 |
| 38. | 50 | 24.78 |

Figure 6:
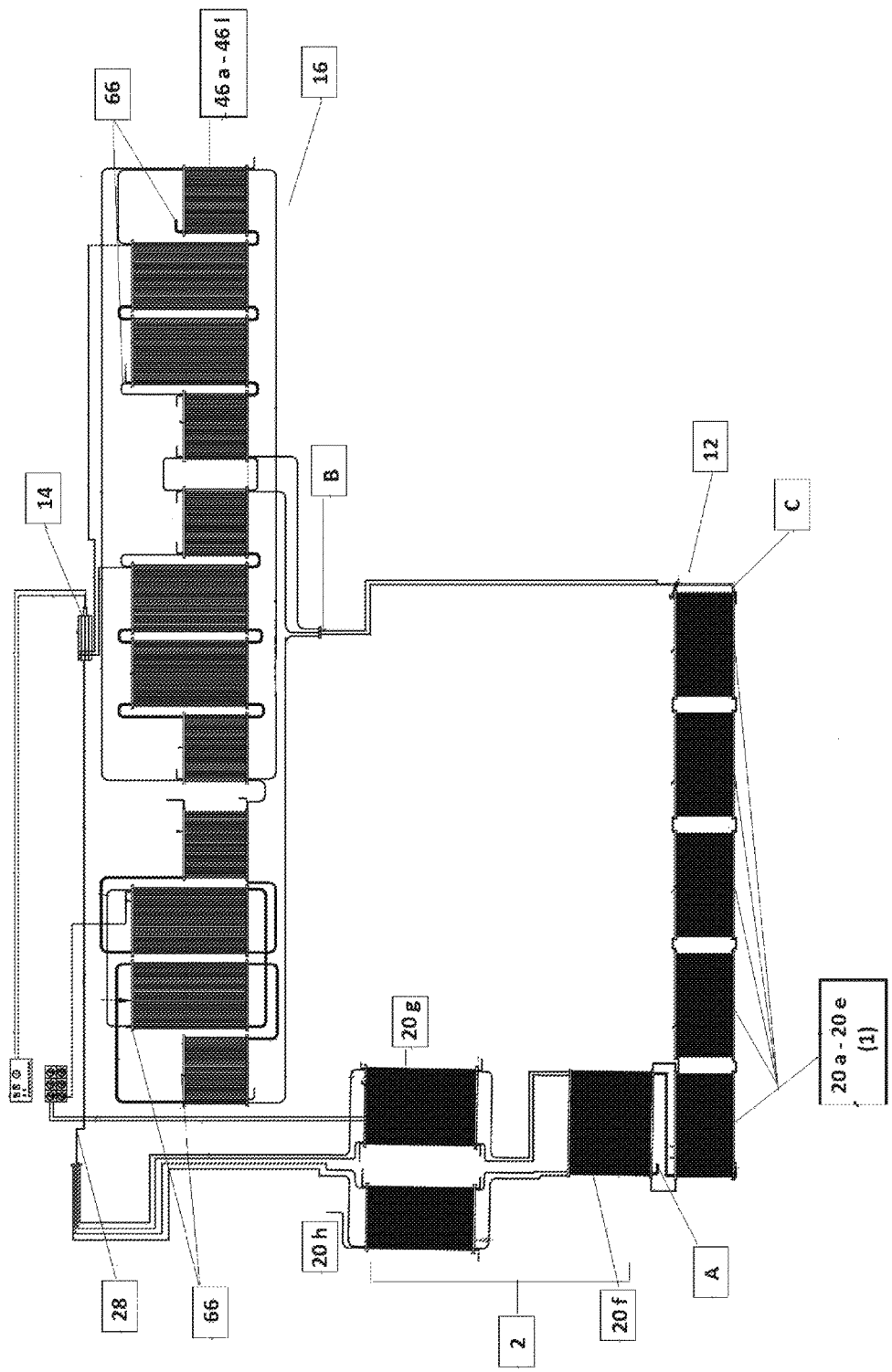
FIG. 6 is a block diagram showing a schematic illustration of a solar power plant according to a modification of the present invention.

The cooled working Fluid flows down from the base of the Cooling Assembly (16) via connecting tubes/pipes to the base of the Heating Assembly (as shown in FIG. 6) from Point 'B' of cooling assembly (16) to Point 'C' of heating assembly (12) by gravity-flow, for its re-heating and re-vaporisation.

The working fluid moves in a sealed closed loop due to temperature and pressure difference between the heating assembly (12), the turbine assembly (14) and the cooling assembly (16). The entire assembly is sealed and the plant internally contains only the Working Fluid and its vapour/s, i.e. all other gases and air are withdrawn from the plant before it is sealed. Essentially, this invention works on the principle of relative Vacuum—Vapour difference being created by the Working Fluid Vapours (the vapour pressure), in the Heating and Cooling Assemblies. Thus, the invention works efficiently only when the working Fluid and its vapours are present in the closed loop assembly. Therefore, all other gases, air etc. have to be extracted before sealing and operating the closed loop assembly. The working Fluid once introduced into the heating assembly, does not get consumed to any extent, while generating electricity. Thus the system of the present invention is a self-contained assembly and does not consume any fuel while generating electricity.

In another embodiment of the present invention, FIG. 6 represents a block diagram of a power plant wherein a plurality of heating units (20) and cooling units (46) have been employed. The following exemplary embodiment should be considered to be an alternative example to broaden the scope of the invention; and should be construed as illustrating and not limiting, the scope of the present invention.

As shown in FIG. 6, the power generation plant encompassed in the present invention comprises a heating assembly (12), a turbine assembly (14) and a cooling assembly (16), wherein construction and working of each assembly has been described in details as follows:

Fabrication of Heating Assembly (12):

A heating unit (20) of the heating assembly was constructed in the following manner:—Metal (preferably Copper) Tubing coil of dimensions O.D. 7.8 mm I.D. 6.6 mm was straightened and cut into pieces of equal size to form heating metal pipes (22). The top and the bottom heating metal tubes (24) of dimensions, O.D. −25 mm & I.D. −22 mm were taken and holes were drilled at equal spacing (to hold the ends of the straightened tubing of size O.D. 7.8 mm I.D. 6.6 mm). The heating metal pipes (22) were then soldered or gas brazed to the heating metal tubes (24) to form a heating unit, 20a. Similarly, 7 other heating units were constructed to make 8 heating units (20a, 20b, 20c, 20d, 20e, 20f, 20g, and 20h) in total. Each unit was then separately tested to check and to confirm that they were externally sealed. The testing was carried out at a pressure of 240 psi and the pressure was held/maintained for a time span of 14 days each. Thereafter five Heating Units (20a, 20b, 20c, 20d and 20e) of the Heating Assembly (12) were inter-connected to each other both at the top and at the bottom to constitute one functional unit (1) through connecting tubes. This functional Unit (1) of the Heating Assembly was then again pressure tested similarly at 240 psi for 14 days. Similarly, heating units, 20f, 20g and 20h were interconnected to each other by connecting tubes and tested for the leakage in a similar manner to constitute one functional unit (2).

The functional unit (1) was kept at the ground level whereas the functional unit (2) was kept above the base level, preferably installed at a height as compared to the functional unit (1). The heating units of the functional unit (2) may be at same height or at different height relative to each other. Preferably, the heating unit, 20f was clamped at a height above the ground level and aligned to face the sun whereas the heating units 20g and 20h were kept on the rooftop.

The functional unit (1) essentially holds the working liquid in liquid form and receives the cooled down working liquid from the cooling assembly (16), whereas the functional unit (2) usually holds vapours of the working liquid which are then fed into the turbine assembly (14). Both the functional units of the heating assembly (12) were then connected to each other, sealed and tested for leakage in the manner mentioned above.

Fabrication of Cooling Assembly (16):

A cooling unit (46) of the cooling assembly was constructed in the following manner:—Metal (preferably Copper) Tubing coil of dimensions O.D. 7.8 mm I.D. 6.6 mm was straightened and cut into pieces of equal size to form metal pipes. The metal pipes were then wrapped with an absorbent fabric/cloth to form cooling metal pipes (48). The top and the bottom cooling metal tubes (50) of dimensions, O.D. −25 mm & I.D. −22 mm were taken and holes were drilled at equal spacing (to hold the ends of the straightened tubing of size O.D. 7.8 mm I.D. 6.6 mm). The cooling metal pipes (48) were then soldered or gas brazed to the cooling metal tubes (50) to form a cooling unit, 46a. Similarly, 11 other cooling units were constructed to make 12 cooling units (46a-46L) in total. The cooling units (46a-46L) may be of same sizes or different sizes. As shown in FIG. 6, 6 cooling units of bigger size and 6 cooling units of smaller size were constructed. Each unit was sealed and tested separately for leakage. The cooling units were enclosed in a metal framework and were then setup against a wall such that the base of the Cooling Assembly (16) was 18 feet above the base of the heating assembly placed at the ground level. The cooling metal tubes (50) towards the base of all Cooling units (46a-46L) were then inter-connected and similarly the cooling metal tubes (50) towards the top of the Cooling Assembly (16) were inter-connected to each other to form one composite Cooling Assembly. The entire assembly was sealed and tested for leakage in a similar manner as was done in the fabrication of the heating assembly (12).

The Cooling Assembly (16) was then connected to the Heating Assembly (12) by means of metal (copper) tubing. The base of the Cooling Assembly (16) was connected to the base of the Heating Assembly (12).

Fabrication of Turbine Assembly (14):

The turbine assembly (14) (as shown in FIG. 3) was fabricated as follows: A metal casing (26) having an inlet (42) to receive a collector pipe (28) from the heating assembly (12) and an outlet point (44) for passage of a carrier pipe (56) carrying the cooled-down working fluid to the cooling assembly (16) was made of copper tubing and covered with metal sheets. The metal casing (26) was configured to receive a circular turbine (30). The circular turbine (30) was a cylindrical wooden structure with one end closed, and had an interior surface (36) and an exterior surface (40). A loop of metal conduit (38) of dimension O.D.12 mm, I.D. 11 mm was looped around the exterior surface (40) of the circular turbine (30). Copper tube branches of dimension O.D. 6 mm I.D. 5.4 mm, were drawn-out from the looped around Copper Tube of dimension O.D. 12 mm I.D. 11 mm. Copper capillary tubes (52) were soldered onto the ends of the Copper tube branches and on the ends of the Capillary tubes were soldered tubes (Hypodermic needles)—two jets (58) of size I.D. 0.603 mm of Needle No. 20 and two jets of size I.D 0.413 mm of Needle No. 22. Various combinations of jets/nozzles (58) were tried and tested for obtaining maximum speed of the impeller (32). The maximum efficiency was determined to be a combination of 2 jets/nozzles (58) of I.D. 0.603 mm and 2 jets/ nozzles of I.D. 0.413 mm.

A Dynamo/Generator was set up on a metal plate and configured to the centre of the circular base using a holder. An Aluminium Impeller (32) was then prepared (as shown in FIG. 5). Riveted Copper sheet Fins (62) were fixed on the circumference of the impeller (32) in such a manner that the fins were aligned at right angles to the nozzle/jets (58) so that thrust of the heated vapours of the working fluid was maximum so as to attain high speed of rotation of the impeller (32). The impeller was fixed to the Dynamo/Generator through a shaft Further, two wires (+ positive and − negative) of the generator/dynamo were taken out of metal container/casing (26). The exit points of the two wires so drawn out were then sealed with hard epoxy resin. The entire turbine assembly (14) was tested and then sealed. The sealed turbine assembly (14) was tested for leakage and then fixed on a holder and was kept above the Cooling Assembly (16).

The entire assembly i.e. the heating assembly (12), the turbine assembly (14) and the cooling assembly (16) was connected by the connecting metal pipes to make a closed loop. The assembly was sealed and the set-up was then pressure tested at 30 p.s.i. over one week. The amount of working fluid i.e. diethyl ether was calculated for running the invention which came out to be ~28 liter for the exemplary assembly. The working liquid was then introduced in the heating assembly (12) via the points kept for servicing (for instance the working fluid may be introduced from point A, as shown in FIG. 2).

Having filled the Heating Assembly with 28 liters of diethyl ether, the filling points were then sealed with Solder. (Gas Brazing was not used further for sealing as the working fluid i.e. diethyl ether being highly inflammable).

The servicing points (66) at the top of the Cooling Assembly Units were then opened for 8 hours to let out the vapours of the Working Fluid, diethyl ether, and along with these vapours the trapped air inside the power plant assembly. The calculations of liquid diethyl ether (working fluid) required to run the invention successfully, included the amount of the diethyl ether (working fluid) lost as vapours during the above process of letting out its vapours.

The power plant as illustrated above was thus fabricated and electricity was produced using the direct sun rays or the ambient temperature i.e the temperature of the surroundings. The plant started working at a temperature above 30° C. and water was sprayed at an interval of 5-15 minutes during the working of the power plant. The power plant of the present invention may be varied in size and capacity according to the energy requirement i.e. from stand-alone for domestic use to many mega-watts for industrial use.

The solar power plant of the present invention has been designed to be setup in a vertical position with minimal horizontal spread, and therefore it covers very less surface area as compared to the existing solar power plants. The life span of the power plant may be increased by proper maintenance of the components of the system. The system of the present invention does not require direct rays of the sun and is functional even with the ambient (surrounding) heat of the atmosphere. Also, it does not require any fuel consumption during its working. Further, the solar power plant of the present invention is economical as the costs of system set up, installation and maintenance of the present invention are lower than the existing solar power plants.

The invention claimed is:

1. A plant to generate power (10) comprising:
   a heating assembly (12) comprising at least one heating unit (20), wherein the at least one heating unit (20) comprises a plurality of parallely and vertically aligned thin heating metal pipes (22), each heating metal pipe (22) comprising two ends, the heating metal pipes (22) connected at both ends by horizontally aligned heating metal tubes (24), wherein the heating metal pipes (22) and the heating metal tubes (24) are connected to make a continuous channel for the passage of a working fluid;
   a cooling assembly (16) comprising at least one cooling unit (46), wherein the at least one cooling unit (46) comprises a plurality of parallely and vertically aligned thin cooling metal pipes (48), each cooling metal pipe (48) comprising two ends, the cooling metal pipes (48) connected at both ends by horizontally aligned cooling metal tubes (50), wherein the cooling metal pipes (48) and the cooling metal tubes (50) are connected to make a continuous channel for the passage of the working fluid, and
   a turbine assembly (14) placed at a higher elevation than the cooling assembly (16) which in turn is placed at a higher elevation than the heating assembly (12);
   wherein the turbine assembly (14) comprises:
   an impeller (32);
   a circular turbine (30) comprising side walls (34) having an interior surface (36) facing the impeller (32) and an exterior surface (40) surrounded by a loop of metal conduit (38), wherein
      branches of the metal conduit (38) surrounding the circular turbine (30) penetrate the side walls (34) to eject vapours of the working fluid over the impeller (32);
      the branches of the metal conduit (38) surrounding the turbine (30) further branch into sub-branches/plurality of capillaries (52); and each of the sub-branches/plurality of capillaries (52) ends with a nozzle/jet (58) facing the impeller (32); and a metal casing (26) having an inlet point (42) to receive a collector pipe (28) carrying the working fluid from the heating assembly (12) and an outlet point (44) connected to a carrier pipe (56) for carrying the working fluid to the cooling assembly (16), wherein the metal casing (26) encloses the circular turbine (30) which further encloses the impeller (32);

wherein the heating assembly (12), the turbine assembly (14) and the cooling assembly (16) are connected to make a closed loop system.

2. The power plant as claimed in claim 1, wherein the impeller (32) is connected to a dynamo/generator (60) through a shaft (64).

3. The power plant as claimed in claim 1, wherein:
the heating metal tubes (24) include heating metal tubes (24) towards a base of the heating assembly (12);
the cooling metal tubes (50) include cooling metal tubes (50) towards a top of the cooling assembly (16) which receive a cooled-down working fluid from the carrier pipe (56); and
the cooling metal tubes (50) include a cooling metal tube (50) towards a base of the cooling assembly (16) that is connected to the heating metal tubes (24) towards the base of the heating assembly (12).

4. The power plant as claimed in claim 1, wherein the working fluid is an inert organic liquid having latent heat of vaporization in the range of 15 to 30 Kilo Joule per mole at 11° C. and a boiling point in the range of 10° C. to 40° C.

5. The power plant as claimed in any of the preceding claims, wherein the working fluid is selected from a group consisting of diethyl ether, dichloromethane, pentane, hexane, propane and a combination thereof.

6. The power plant as claimed in claim 1, wherein the heating metal pipes (22) and the heating metal tubes (24) are made up of material selected from a group of copper, aluminium, zinc, brass and alloys thereof.

7. The power plant as claimed in claim 1, wherein the impeller (32) is made up of aluminium or its alloys thereof.

8. The power plant as claimed in claim 1, wherein ends of the capillaries (52) have a diameter in the range of 0.2 mm to 1.8 mm.

9. The power plant as claimed in claim 1, wherein the cooling metal pipes (48) and the cooling metal tubes (50) are made up of material selected from a group of copper, aluminium, zinc, brass and alloys thereof.

10. The power plant as claimed in claim 1, wherein the heating assembly (12) and the cooling assembly (16) are maintained at different temperatures.

11. The power plant as claimed in claim 1, wherein the at least one heating units (20) is adapted to be inclined to face the sun.

12. The power plant as claimed in claim 11, wherein an angle of inclination of the at least one heating units (20) is based upon the latitude position of the sun.

13. The power plant as claimed in claim 1, wherein the at least one heating unit (20) comprises two or more heating units (20) that are placed at varying heights relative to each other.

14. The power plant as claimed in claim 13, wherein the two or more heating units (20) are interconnected via the heating metal tubes (24).

15. The power plant as claimed in claim 1, wherein the at least one cooling unit (46) comprises two or more cooling units (46) that are placed at varying heights relative to each other.

16. The power plant as claimed in claim 15, the two or more cooling units (46) are interconnected via the cooling metal tubes (50).

17. The power plant as claimed in claim 1, wherein the temperature of the cooling assembly (16) is maintained lower than that of the heating assembly (12) using a cooling medium.

18. The power plant as claimed in claim 17, wherein the cooling medium is water.

* * * * *